US005695599A

United States Patent [19]

Pankoke

[11] Patent Number: 5,695,599

[45] Date of Patent: Dec. 9, 1997

[54] CONTINUOUS PRESS ASSEMBLY FOR MAKING LAMINATES

[75] Inventor: Werner Pankoke, Bielefeld, Germany

[73] Assignee: Firma Theodor Hymmen, Bielefeld, Germany

[21] Appl. No.: 567,197

[22] Filed: Dec. 5, 1995

[30] Foreign Application Priority Data

Dec. 8, 1994 [DE] Germany .......................... 44 43 763.3

[51] Int. Cl.$^{6}$ .................................................... B29C 43/48

[52] U.S. Cl. .......................... 156/555; 100/151; 156/578; 156/583.5; 425/371

[58] Field of Search .................................... 156/555, 578, 156/583.1, 583.5; 425/371; 100/151, 153, 154, 207, 93 RP

[56] References Cited

U.S. PATENT DOCUMENTS

| | | | |
|---|---|---|---|
| 3,671,355 | 6/1972 | Paymal | 156/555 X |
| 4,095,312 | 6/1978 | Haley | 19/308 |
| 4,420,357 | 12/1983 | Neubauer et al. | 156/274.6 |
| 4,816,092 | 3/1989 | Raura | 156/62.2 |
| 4,895,508 | 1/1990 | Held | 425/371 |
| 5,149,394 | 9/1992 | Held | 156/555 |
| 5,167,978 | 12/1992 | Gersbeck | 425/373 |
| 5,284,546 | 2/1994 | Tilby | 156/583.5 |
| 5,490,900 | 2/1996 | Held | 156/555 |
| 5,527,422 | 6/1996 | Lehmann et al. | 156/555 |
| 5,532,050 | 7/1996 | Brooks | 428/220 |

*Primary Examiner*—James Sells
*Attorney, Agent, or Firm*—Henry M. Feiereisen

[57] ABSTRACT

Apparatus for making laminates such as a wood panel, in particular a chip board or a fiber board or the like, includes a prepress having an inlet for receiving particulate material such as wood particles and adapted to form a pressing zone in which the wood particles are conducted initially in vertical direction and subsequently laterally deflected by 90° along a curved path to form a material strand. The prepress includes two continuous conveyor belts that have upper substantially horizontal belt sections for receiving the particulate material and transporting material webs to the inlet. Extending downstream of the prepress is a main double-belt press for compacting the material strand and for formation of a laminate.

39 Claims, 2 Drawing Sheets

CONTINUOUS PRESS ASSEMBLY FOR MAKING LAMINATES

BACKGROUND OF THE INVENTION

The invention relates to a continuous press assembly for making laminates, such as wood panels, in particular wood chip boards and wood fiber boards or the like.

Wood panels, especially chip boards or fiber boards are widely used in the furniture industry. German Pat. No. DE 36 39 061 A1 describes an apparatus for making wood panels by compacting and pressing wood particles in a double-belt press to form plate-shaped laminates. The double-belt press exhibits a vertical pressing zone with a wedge-shaped inlet area. Received in the inlet area is a compaction plunger which is oscillated at operation by two synchronized eccentrics. The provision of such a compaction plunger adversely affects the quality of the end product because the chips are aligned in parallel relationship to the plunger and thus at a right angle to the surface of the formed laminate, thereby significantly decreasing the bending strength of the finished product. This conventional double-belt press can be dimensioned only of small overall length so that its capacity becomes restricted. As the compaction plunger is received in the wedge-shaped inlet area, only two layers of particulate material can be fed to the inlet area of the press. Thus, the laminate cannot be formed with a central layer of chips that deviate from the structure of the outer chip layers.

SUMMARY OF THE INVENTION

It is an object of the present invention to provide an improved continuous press, obviating the afore-stated drawbacks.

This object, and others will become apparent hereinafter, are attained in accordance with the present invention by disposing ahead of the double-belt press a prepress having an inlet that receives webs of particulate material and is adapted to form a pressing zone in which the material webs are compacted initially in vertical direction and subsequently laterally deflected by 90° along a curved path to form a material strand, with the prepress including two continuous conveyor belts exhibiting upper, substantially horizontal belt sections for conveying the material webs to the inlet.

In order to attain a compact overall construction of the press assembly, all units associated to the prepress are positioned above the main press in the area of the substantially horizontal belt sections of the two conveyor belts. Examples for such units include spraying unit for spreading wood particles on the substantially horizontal belt sections, glue application unit for adding a binder to the wood particles, heating unit for subjecting particulate material conveyed to the inlet area of the main press to heat, a further spraying unit for forming the central layer of the material strand, a unit for applying a hardener to the wood particles, a unit for subjecting the wood particles to steam or hot air before compression in the pressing zone.

According to another feature of the present invention, the prepress has a first pair of guide rollers at the inlet of the pressing zone to deflect the conveyor belts from the substantially horizontal stretch to a vertical stretch. Suitably, the first pair of guide rollers is adjustable horizontally and lockable in place to enable a gap adjustment of the inlet into the pressing zone of the prepress. The pressing zone is defined by coextensive stretches of the conveyor belts which are guided along a curved arrangement of successive pairs of rollers to laterally deflect the material strand by 90° into the horizontal for entry into the main press.

A prepress according to the present invention can be combined with any double-belt press for manufacturing laminates such as wood panels.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
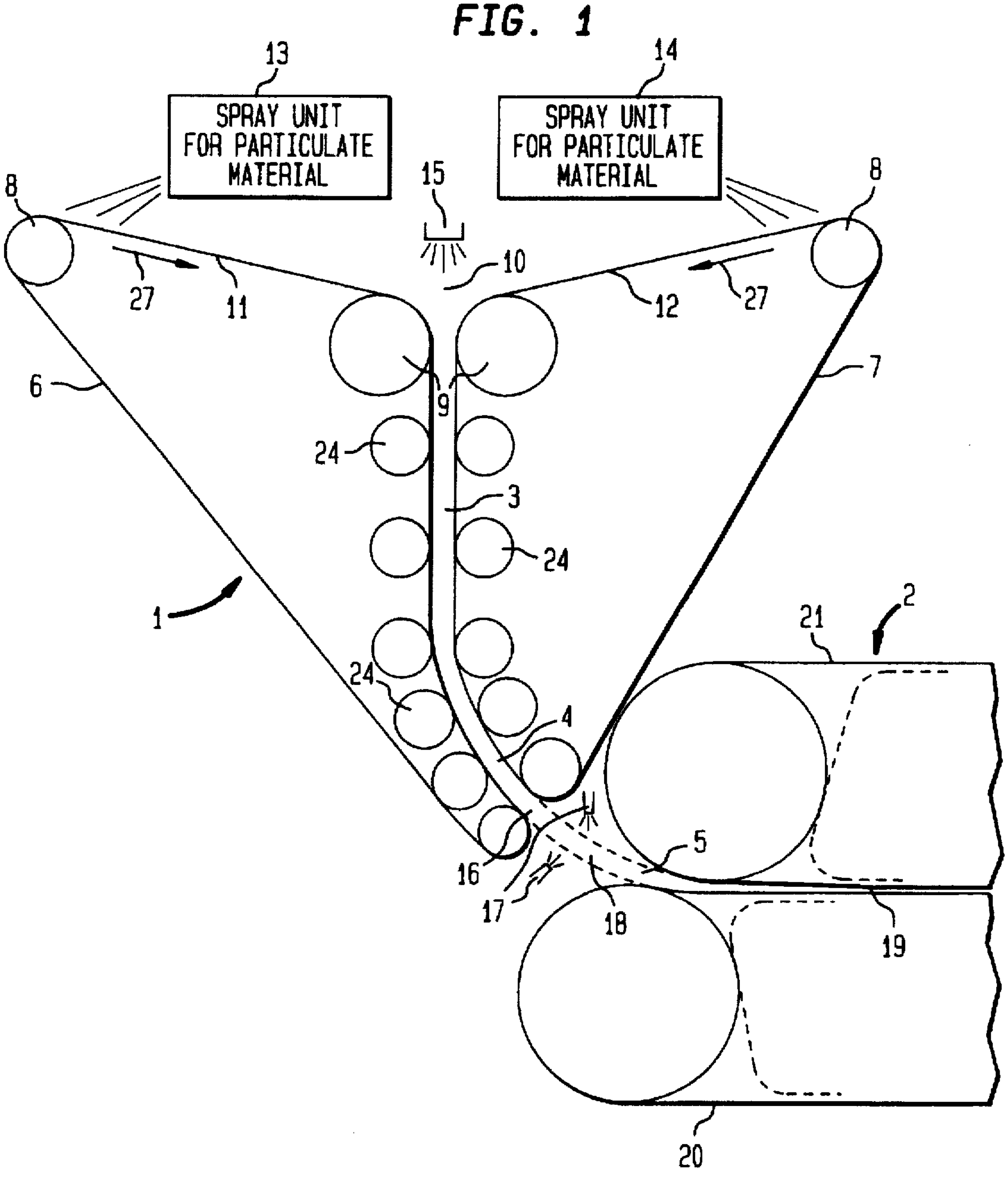
FIG. 1 is a schematic view of one embodiment of a press assembly according to the present invention, combining a prepress with a horizontal main press.

Throughout the Figures, same or corresponding elements are generally indicated by the same reference numerals.

Turning now to the drawing, and in particular to FIG. 1, there is shown a schematic view of one embodiment of a press assembly according to the present invention, including a prepress, generally designated by reference numeral 1, in combination with a horizontal main press, generally designated by reference numeral 2. The main press 2 is configured as continuously operating double-belt press, with a top belt 21 for forming a top surface of a material strand 18 exiting the prepress 1 and entering the main press 2 at inlet area 5, and with a bottom belt 20 for forming the bottom surface of the material strand 18. The bottom belt 20 is positioned beneath the top belt 21 to form a horizontal pressing zone 19 therebetween in which the material strand 18 is conducted and compacted to form the finished laminate. As shown in FIG. 1, the bottom belt 20 exhibits a forward end which slightly projects beyond the forward end of the top belt 21 in order to ensure a smooth reception of the material strand 18.

As shown in FIG. 1, the prepress 1 is disposed upstream ahead of the main press 2 and is also configured as a double-belt press, with two continuous conveyor belts 6, 7 being arranged to form a pressing zone 3, 4 which exhibits a vertical section 3 and an arcuate section 4 that leads into the inlet area 5 of the horizontal main press 2. The conveyor belts 6, 7 are preferably made of rubber and looped around rollers 8 and guide rollers 9 which define a press inlet 10 into the pressing zone 3, 4. The rollers 8 are disposed substantially at a same level as and at a relatively great distance from the guide rollers 9 to form substantially horizontal belt sections 11, 12 that face each other and run in opposition to each other in direction of arrows 27 for transporting respective material webs from opposing directions to the press inlet 10.

Disposed above each of the belt sections 11, 12 is a spray unit 13, 14 for spreading a layer of particulate material on the pertaining belt section 11, 12. In the non-limiting example of FIG. 1, the particulate material as conveyed by the belt sections 11, 12 to the inlet 10 is formed by wood particles that are coated with adhesive. At the press inlet 10, the particulate material webs from the belt sections 11, 12 are placed together forming a layered member which is subsequently compressed in the pressing zone 3, 4 between the respective coextensive stretches of the conveyor belts 6, 7 to form the material strand 18.

Positioned above the inlet 10 of the prepress 1 is a unit 15 for adding a hardener to the material webs transported by the belt sections 11, 12 to the inlet 10. There is also a possibility to place in the area above the central inlet 10 of the prepress 1 a unit (not shown) for subjecting the material webs that enter the pressing zone 3, 4 to steam or hot air before being compacted in the pressing zone 3, 4. In the event, the finished laminate such as wood panels should be provided with a central chip layer of a structure different from the particulate material forming the outer faces of the finished wood panel, a further spraying unit (not shown) for spreading respective wood particles in an area between the outer particulate material webs from belt sections 11, 12 may be positioned above the central inlet 10 of the prepress 1.

Arranged below the guide rollers 9 are pairs of guide rollers 24 which are lined along a curved path so that the material webs after entering the press inlet 10 in a vertical position are curved sideways to the horizontal position when exiting the prepress 1 at discharge end 16 and passed to the main press 2 at inlet 5. This lateral deflection is effected by the curved arrangement of the guide rollers 24 which are closely spaced from each other.

At the transition between the discharge end 16 of the prepress I and the inlet 5 of the main press 2 is a further unit 17 for subjecting the material strand 18 exiting the prepress 1 and being exposed in this area to hot air, hot water or steam.

Figure 2:
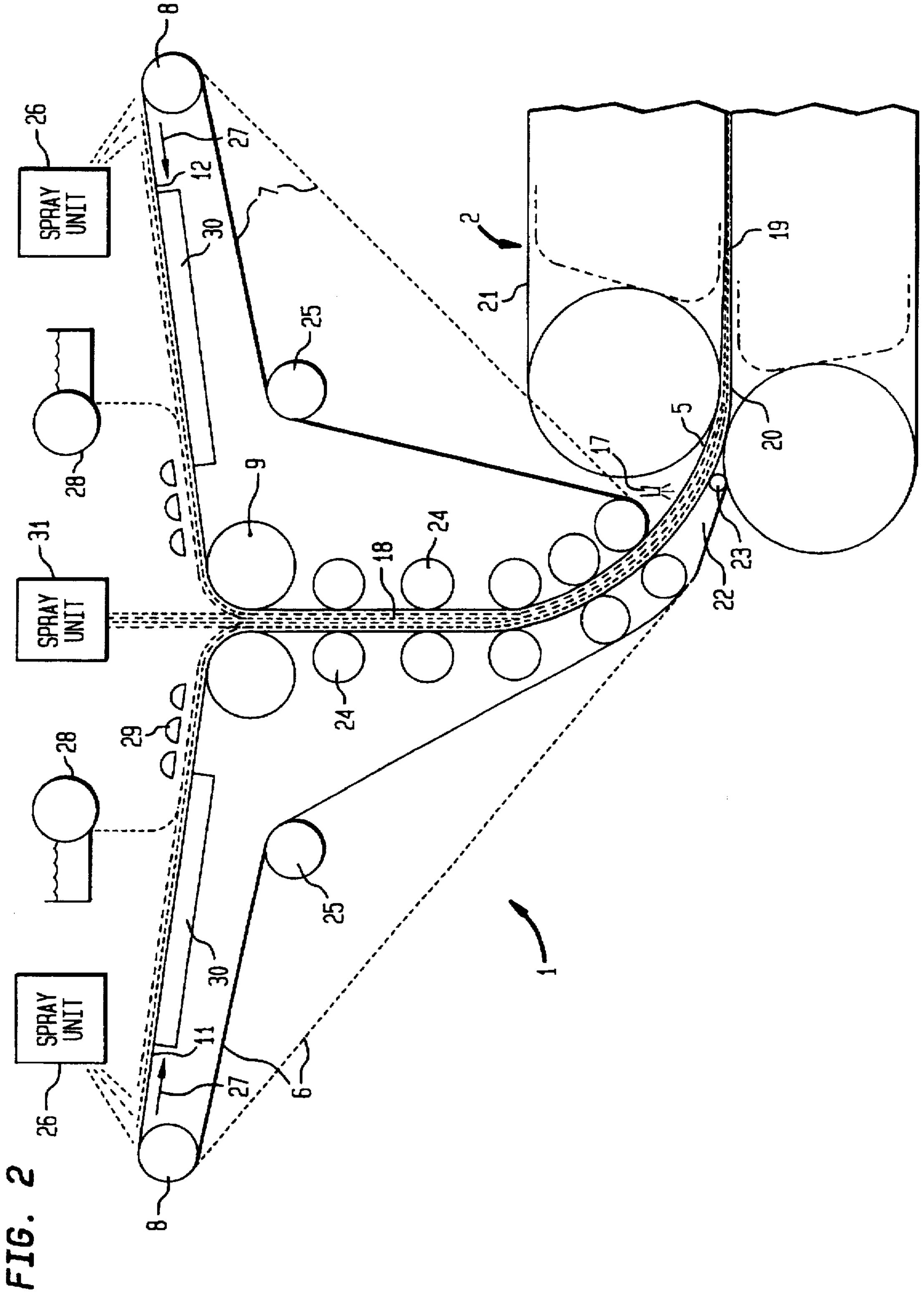
FIG. 2 is a schematic view of another embodiment of a press assembly according to the present invention, combining a prepress with a horizontal main press.

Turning now to FIG. 2, there is shown a schematic view of another embodiment of a press assembly according to the present invention, combining a prepress 1 with a main press 2, with both presses 1, 2 being of the double-belt press type. Same reference numeral have generally been used in FIG. 2 for corresponding elements in FIG. 1. The main press 2 is identical to the configuration shown in FIG. 1.

As shown in FIG. 2, the configuration of the conveyor belts 6, 7 is such that the substantially horizontal belt sections 11, 12 cover a longer stretch than in FIG. 1 so that in order to enable a compact structure of the overall press assembly, the return stretches of the conveyor belts 6, 7 are deflected about rollers 25 which are positioned in proximity of the guide rollers 9. For illustrative purposes, broken lines are shown to indicate the theoretic path of the return stretches when configuring the conveyor belts 6, 7 in a manner shown in FIG. 1, i.e. without deflection rollers 25.

Positioned above the horizontal belt sections 11, 12 near the outer ends thereof, i.e. near the rollers 8, are spraying units 26 for spreading binder-free, dry particulate material (wood chips) onto the belt sections 11, 12 which transport the material webs in direction of arrows 27 past respective glue application units 28 that impregnate the advancing material webs with a resin-type glue. Subsequently, the particulate material webs are conveyed by each belt section 11, 12 past a heating zone 29, e.g. in form of IR radiators.

Further disposed beneath each substantially horizontal belt section 11, 12 is a pre-heating zone 30 which extends from the spraying unit 26 beyond the glue application unit 28. A third spraying unit 31 for spreading particulate material or other additives in vertical direction between the material webs approaching the pressing zone 3, 4 of the prepress 1 from both sides by the belt sections 11, 12 is positioned centrally above the inlet 10 so that a symmetric panel structure is effected with a central layer or additives. It may also be possible to spread pourable wax or powdery resin onto the adhesive-free, dry chips.

At operation, particulate material is spread by the associated spray units 26 onto the belt sections 11, 12 which transport the material webs to the inlet 10 of the pressing zone 3, 4. Upon entry of the pressing zone 3, 4, a further layer of particulate material may be applied in vertical direction and thus in alignment with the material webs on the belt sections 11, 12 as the conveyor belts 6, 7 are deflected by the guide rollers 9. The forming material strand 18 is curved sideways from the vertical position to the horizontal position by the coextensive stretches of the conveyor belts 6, 7 to enter the main press 2 in a substantially horizontal alignment. Suitably, the discharge end 22 of the prepress 1 is positioned above the forward end of the bottom belt 20 of the main press 2, and the deflection of the conveyor belt 6 in the area of the discharge end 22 is effected by an additional guide roller 23 of small diameter or by a suitably formed body 23.

Arranged above the exposed material strand 18 that exits the prepress 1 at the discharge end 22 is a unit 17 by which the material strand 18 is subjected to hot air, hot water or steam.

In both embodiments of a press assembly according to the present invention, the guide rollers 8 am horizontally adjustable and lockable in place for allowing an adjustment of the size of the press inlet 10. It is also possible to provide the guide rollers 9 with a separate drive and/or separate heating unit. Suitably, the prepress 1 partially projects into the area above the main press 2.

While the invention has been illustrated and described as embodied in a continuous press assembly for making laminates, it is not intended to be limited to the details shown since various modifications and structural change may be made without departing in any way from the spirit of the present invention.

What is claimed as new and desired to be protected by Letters Patent is set forth in the appended claims:

I claim:

1. A system for making laminates such as a wood panel, in particular a chip board or a fiber board or the like; comprising:
   - a feeding means for supplying particulate material webs;
   - a prepress having an inlet for receiving the particulate material webs and adapted to form a pressing zone in which the material webs are conducted initially in a vertical position and subsequently laterally deflected along a curved path by an angle not exceeding approximately 90° into a substantially horizontal disposition to form a material strand, said prepress including two continuous conveyor belts exhibiting upper substantially horizontal belt sections for conveying the material webs to the inlet; and
   - a main double-belt press extending downstream of the prepress in horizontal direction for receiving and compacting the material strand to form a laminate.

2. The system of claim 1, and further comprising spraying means positioned adjacent outer ends of the substantially horizontal belt sections of the conveyor belts for spreading particulate material onto the belt sections.

3. The system of claim 2, and further comprising glue application means disposed downstream of the spraying means for impregnating binder-free, dry particulate material with glue before entering the pressing zone.

4. The system of claim 3, further comprising first heating means positioned underneath each substantially horizontal belt section between the spraying means and at least the glue application means for forming a preheating zone.

5. The system of claim 4 wherein the first heating means extends beyond the glue application means.

6. The system of claim 4, and further comprising a second heating means disposed above each belt section between the glue application means and the inlet of the prepress.

7. The system of claim 1, and further comprising a spraying unit positioned in an area above the inlet of the prepress for spreading particulate material for forming a central layer between the material webs.

8. The system of claim 1, and further comprising means positioned in an area above the inlet of the prepress for adding a hardener to the material webs.

9. The system of claim 1, and further comprising means positioned in an area above the inlet of the prepress for subjecting the material webs to steam or hot air before compaction in the pressing zone of the prepress.

10. The system of claim 1 wherein the main press includes two conveyor belts in spaced apart relationship to form a main pressing zone between a top belt and a bottom belt, the pressing zone of the prepress terminating in a discharge end positioned above a forward end of the bottom belt, with the forward end of the bottom belt slightly projecting beyond a forward end of the top belt.

11. The system of claim 1, and further comprising means positioned between the prepress and the main press for subjecting the material strand to hot air, hot water or steam.

12. The system of claim 1 wherein the prepress has first roller means in an area of the inlet for deflecting the conveyor belts from a substantially horizontal stretch to a vertical stretch, said roller means being adjustable horizontally and lockable in place for gap adjustment of the inlet.

13. The system of claim 12 wherein the first roller means includes a drive for driving the roller means in the area of the inlet.

14. The system of claim 12 wherein the first roller means includes a heating unit for raising the temperature of the roller means in the area of the inlet.

15. The system of claim 1 wherein the prepress is provided with second roller means in form of closely spaced guide rollers arranged downstream of the inlet to form a curved path for effecting the lateral deflection of the pressing zone by 90°.

16. The system of claim 1 wherein the conveyor belts of the prepress are made of rubber.

17. A system for making laminates; comprising:

a feeding means for supplying particulate material webs;

a prepress having an inlet for receiving the particulate material webs and adapted to form a pressing zone in which the material webs are compacted initially in a vertical position and subsequently laterally deflected along a curved path by an angle not exceeding approximately 90° into a substantially horizontal disposition to form a material strand; and a main press extending downstream of the prepress in horizontal direction for receiving and compacting the material strand to form a laminate.

18. The system of claim 17 wherein said prepress includes two continuous conveyor belts exhibiting upper substantially horizontal belt sections for conveying the material webs to the inlet from opposing directions.

19. The system of claim 17 wherein the prepress is provided with roller means in form of closely spaced guide rollers arranged downstream of the inlet to define the pressing zone between coextensive stretches of the conveyor belts and to form a curved path for effecting the lateral deflection of the pressing zone by 90°.

20. The system of claim 18, and further comprising first spraying means positioned above the substantially horizontal belt sections of the conveyor belts for spreading particulate material onto the belt sections, and second spraying means positioned in an area above the inlet of the prepress for spreading particulate material between the material webs entering the inlet to form a central layer.

21. Apparatus for making laminates such as a wood panel, in particular a chip board or a fiber board or the like; comprising:

a prepress having an inlet for receiving particulate material webs and adapted to form a pressing zone in which the material webs are conducted initially in a vertical position and subsequently laterally deflected along a curved path by an angle not exceeding approximately 90° into a substantially horizontal disposition to form a material strand, said prepress including two continuous conveyor belts exhibiting upper substantially horizontal belt sections for conveying the material webs to the inlet; and a main double-belt press extending downstream of the prepress in horizontal direction for receiving and compacting the material strand to form a laminate, said main press including two conveyor belts in spaced apart relationship to form a main pressing zone between a top belt and a bottom belt, the pressing zone of the prepress terminating in a discharge end which projects into an area above a forward end of the bottom belt, with the forward end of the bottom belt slightly projecting beyond a forward end of the top belt.

22. The apparatus of claim 21, and further comprising spraying means positioned adjacent outer ends of the substantially horizontal belt sections of the conveyor belts for spreading particulate material onto the belt sections.

23. The apparatus of claim 22, and further comprising glue application means disposed downstream of the spraying means for impregnating binder-free, dry particulate material with glue before entering the pressing zone.

24. The apparatus of claim 23, further comprising first heating means positioned underneath each substantially horizontal belt section between the spraying means and at least the glue application means for forming a preheating zone.

25. The apparatus of claim 24 wherein the first heating means extends beyond the glue application means.

26. The apparatus of claim 24, and further comprising a second heating means disposed above each belt section between the glue application means and the inlet of the prepress.

27. The apparatus of claim 21, and further comprising a spraying unit positioned in an area above the Inlet of the prepress for spreading particulate material for forming a central layer between the material webs.

28. The apparatus of claim 21, and further comprising means positioned in an area above the Inlet of the prepress for adding a hardener to the material webs.

29. The apparatus of claim 21, and further comprising means positioned in an area above the inlet of the prepress for subjecting the material webs to steam or hot air before compaction in the pressing zone of the prepress.

30. The apparatus of claim 21, and further comprising means positioned between the prepress and the main press for subjecting the material strand to hot air, hot water or steam.

31. The apparatus of claim 21 wherein the prepress has first roller means in an area of the inlet for deflecting the conveyor belts from a substantially horizontal stretch to a vertical stretch, said roller means being adjustable horizontally and lockable in place for gap adjustment of the inlet.

32. The apparatus of claim 31 wherein the first roller means includes a drive for driving the roller means in the area of the inlet.

33. The apparatus of claim 31 wherein the first roller means includes a heating unit for raising the temperature of the roller means in the area of the inlet.

34. The apparatus of claim 21 wherein the prepress is provided with second roller means in form of closely spaced guide rollers arranged downstream of the inlet to form a curved path for effecting the lateral deflection of the pressing zone by 90°.

35. The apparatus of claim 21 wherein the conveyor belts of the prepress are made of rubber.

36. Apparatus for making laminates; comprising:

a prepress having an .inlet for receiving the particulate material webs and adapted to form a pressing zone in which the material webs are compacted initially in a vertical position and subsequently laterally deflected along a curved path by an angle not exceeding approximately 90° into a substantially horizontal disposition to form a material strand; and a main press extending downstream of the prepress in horizontal direction for receiving and compacting the material strand to form a laminate, said main press including two conveyor belts in spaced apart relationship to form a main pressing zone between a top belt and a bottom belt, the pressing zone of the prepress terminating in a discharge end which projects into an area above a forward end of the bottom belt, with the forward end of the bottom belt slightly projecting beyond a forward end of the top belt.

37. The apparatus of claim 36 wherein said prepress includes two continuous conveyor belts exhibiting upper substantially horizontal belt sections for conveying the material webs to the inlet from opposing directions.

38. The apparatus of claim 36 wherein the prepress is provided with roller means in form of closely spaced guide rollers arranged downstream of the inlet to define the pressing zone between coextensive stretches of the conveyor belts and to form a curved path for effecting the lateral deflection of the pressing zone by 90°.

39. The apparatus of claim 37, and further comprising first spraying means positioned above the substantially horizontal belt sections of the conveyor belts for spreading particulate material onto the belt sections, and second spraying means positioned in an area above the inlet of the prepress for spreading particulate material between the material webs entering the inlet to form a central layer.

* * * * *